US012801712B2

(12) United States Patent
Amada

(10) Patent No.: US 12,801,712 B2
(45) Date of Patent: Nov. 17, 2026

(54) INFORMATION PROCESSING APPARATUS, INFORMATION PROCESSING METHOD, AND NON-TRANSITORY RECORDING MEDIUM

(71) Applicant: NEC Corporation, Tokyo (JP)

(72) Inventor: Takuma Amada, Tokyo (JP)

(73) Assignee: NEC CORPORATION, Tokyo (JP)

( * ) Notice: Subject to any disclaimer, the term of this patent is extended or adjusted under 35 U.S.C. 154(b) by 41 days.

(21) Appl. No.: 18/851,264

(22) PCT Filed: Mar. 31, 2022

(86) PCT No.: PCT/JP2022/016935

§ 371 (c)(1),
(2) Date: Sep. 26, 2024

(87) PCT Pub. No.: WO2023/188409

PCT Pub. Date: Oct. 5, 2023

(65) Prior Publication Data

US 2025/0217462 A1 Jul. 3, 2025

(51) Int. Cl.

*H04L 29/06* (2006.01)
*G06F 21/32* (2013.01)

(Continued)

(52) U.S. Cl.

CPC ............ *G06F 21/32* (2013.01); *G06V 10/761* (2022.01); *G06V 40/172* (2022.01)

(58) Field of Classification Search

CPC .......... G06F 21/32; G06F 21/57; G06F 11/34; G06F 11/3409; G06F 21/30; G06F 21/44;

(Continued)

(56) References Cited

U.S. PATENT DOCUMENTS

2019/0130110 A1 5/2019 Lee et al.
2021/0287141 A1* 9/2021 Molloy .................... G06N 3/09

(Continued)

FOREIGN PATENT DOCUMENTS

CN 112434213 A 3/2021
CN 113792729 A 12/2021

(Continued)

OTHER PUBLICATIONS

International Search Report for PCT Application No. PCT/JP2022/016935, mailed on Jul. 5, 2022.

(Continued)

*Primary Examiner* — Edward Zee
*Assistant Examiner* — Leynna Truvan
(74) *Attorney, Agent, or Firm* — Sughrue Mion, PLLC

(57) ABSTRACT

An information processing apparatus includes: a similarity degree calculation unit that calculates a degree of similarity between a feature quantity of first information and a feature quantity of second information; a gradient information calculation unit that calculates gradient information indicating a gradient of the degree of similarity; a perturbing position determination unit that determines an element serving as a perturbing target in the first information, on the basis of the gradient information; a perturbing unit that applies a perturbation to the element serving as the perturbing target in the first information; and a risk assessment unit that assesses a risk in authentication processing on the basis of a result of the authentication processing of collating/verifying the first information to which the perturbation is applied, and the second information. According to such an information processing apparatus, it is possible to properly assess the risk in the authentication processing.

9 Claims, 13 Drawing Sheets

(51) Int. Cl.
*G06V 10/74* (2022.01)
*G06V 40/16* (2022.01)

(58) Field of Classification Search
CPC .... G06V 10/761; G06V 40/172; G06V 20/95; G06V 10/473; G06V 30/1831; H04L 63/08; G01R 33/022; G03G 21/1892; G03H 1/0011; G05B 2219/31461; G05B 23/0227; G05B 23/024; G05B 13/022; G05B 13/0225; G05B 2219/40471; G05B 2219/31477; G06Q 30/06313; G06Q 20/4016; G06Q 20/3674; G01N 29/52
See application file for complete search history.

(56) References Cited

U.S. PATENT DOCUMENTS

| | | | | |
|---|---|---|---|---|
| 2022/0108026 | A1* | 4/2022 | Ortiz | G06F 12/1408 |
| 2022/0343214 | A1 | 10/2022 | Kakizaki | |
| 2023/0029988 | A1 | 2/2023 | Yoshida | |

FOREIGN PATENT DOCUMENTS

| | | | |
|---|---|---|---|
| CN | 113869152 | A | 12/2021 |
| CN | 114049537 | A | 2/2022 |
| JP | 2021-501414 | A | 1/2021 |
| WO | 2021/038788 | A1 | 3/2021 |
| WO | 2021/144857 | A1 | 7/2021 |

OTHER PUBLICATIONS

English translation of Written opinion for PCT Application No. PCT/JP2022/016935, mailed on Jul. 5, 2022.

Danny Karmon et al., "LaVAN: Localized and Visible Adversarial Noise", arXiv, Mar. 2018, 1801.02608, v2, pp. 1-9, [retrieved on Jun. 24, 2022], retrieved from the Internet: <URL: https://arxiv.org/abs/1801.02608v2>.

* cited by examiner

INFORMATION PROCESSING APPARATUS, INFORMATION PROCESSING METHOD, AND NON-TRANSITORY RECORDING MEDIUM

This application is a National Stage Entry of PCT/JP2022/016935 filed on Mar. 31, 2022, the contents of all of which are incorporated herein by reference, in their entirety.

TECHNICAL FIELD

This disclosure relates to technical fields of an information processing apparatus, an information processing method, and a recording medium.

BACKGROUND ART

A know system of this type evaluates an authenticator that performs authentication processing. For example, Patent Literature 1 discloses that a quantitative evaluation value of robustness against an adversarial sample is calculated in an authentication model for face authentication or the like.

As another related technique/technology, for example, Patent Literature 2 discloses that candidates of the adversarial sample are obtained by using a feature vector of a face image, thereby obtaining the candidates of the adversarial sample that easily mislead the face authentication by a face authentication apparatus. Patent Literature 3 discloses that an adversarial input is generated such that an attacker is misrecognized in the face authentication.

CITATION LIST

Patent Literature

Patent Literature 1: International Publication No. WO2021/038788

Patent Literature 2: International Publication No. WO2021/144857

Patent Literature 3: JP2021-501414A

SUMMARY

Technical Problem

This disclosure aims to improve the techniques/technologies disclosed in Citation List.

Solution to Problem

An information processing apparatus according to an example aspect of this disclosure includes: a similarity degree calculation unit that calculates a degree of similarity between a feature quantity of first information and a feature quantity of second information; a gradient information calculation unit that calculates gradient information indicating a gradient of the degree of similarity; a perturbing position determination unit that determines an element serving as a perturbing target in the first information, on the basis of the gradient information; a perturbing unit that applies a perturbation to the element serving as the perturbing target in the first information; and a risk assessment unit that assesses a risk in authentication processing on the basis of a result of the authentication processing of collating/verifying the first information to which the perturbation is applied, and the second information.

An information processing method according to an example aspect of this disclosure includes: calculating a degree of similarity between a feature quantity of first information and a feature quantity of second information; calculating gradient information indicating a gradient of the degree of similarity; determining an element serving as a perturbing target in the first information, on the basis of the gradient information; applying a perturbation to the element serving as the perturbing target in the first information; and assessing a risk in authentication processing on the basis of a result of the authentication processing of collating/verifying the first information to which the perturbation is applied, and the second information.

A recording medium according to an example aspect of this disclosure is a recording medium on which a computer program that allows at least one computer to execute an information processing method is recorded, the information processing method including: calculating a degree of similarity between a feature quantity of first information and a feature quantity of second information; calculating gradient information indicating a gradient of the degree of similarity; determining an element serving as a perturbing target in the first information, on the basis of the gradient information; applying a perturbation to the element serving as the perturbing target in the first information; and assessing a risk in authentication processing on the basis of a result of the authentication processing of collating/verifying the first information to which the perturbation is applied, and the second information.

DESCRIPTION OF EXAMPLE EMBODIMENTS

Hereinafter, an information processing apparatus, an information processing method, and a recording medium according to example embodiments will be described with reference to the drawings.

First Example Embodiment

An information processing apparatus according to a first example embodiment will be described with reference to FIG. 1 to FIG. 3.

(Hardware Configuration)

First, with reference to FIG. 1, a hardware configuration of the information processing apparatus according to the first example embodiment will be described. FIG. 1 is a block diagram illustrating the hardware configuration of the information processing apparatus according to the first example embodiment.

Figure 1:
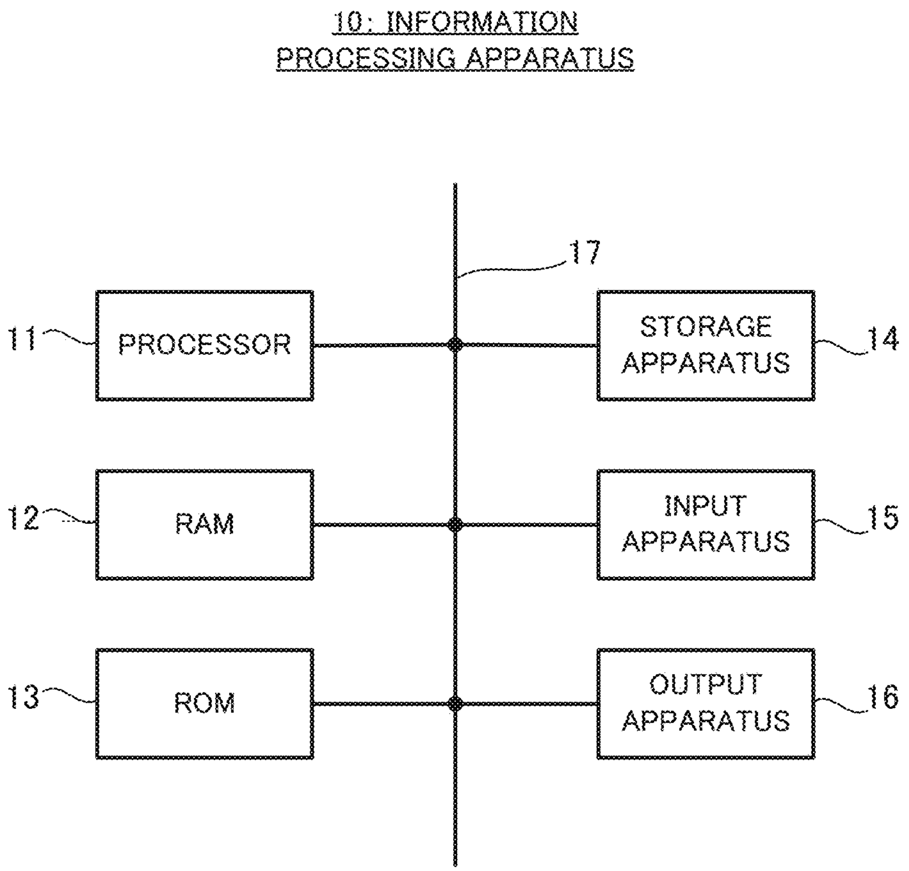
FIG. 1 is a block diagram illustrating a hardware configuration of an information processing apparatus according to a first example embodiment.

As illustrated in FIG. 1, an information processing apparatus 10 according to the first example embodiment includes a processor 11, a RAM (Random Access Memory) 12, a ROM (Read Only Memory) 13, and a storage apparatus 14. The information processing apparatus 10 may further include an input apparatus 15 and an output apparatus 16. The processor 11, the RAM 12, the ROM 13, the storage apparatus 14, the input apparatus 15, and the output apparatus 16 are connected through a data bus 17.

The processor 11 reads a computer program. For example, the processor 11 is configured to read a computer program stored by at least one of the RAM 12, the ROM 13 and the storage apparatus 14. Alternatively, the processor 11 may read a computer program stored in a computer-readable recording medium, by using a not-illustrated recording medium reading apparatus. The processor 11 may acquire (i.e., may read) a computer program from a not-illustrated apparatus disposed outside the information processing apparatus 10, through a network interface. The processor 11 controls the RAM 12, the storage apparatus 14, the input apparatus 15, and the output apparatus 16 by executing the read computer program. Especially in the present example embodiment, when the processor 11 executes the read computer program, a functional block for assessing a risk of authentication processing is realized or implemented in the processor 11. That is, the processor 11 may function as a controller for executing each control in the information processing apparatus 10.

The processor 11 may be configured as, for example, a CPU (Central Processing Unit), a GPU (Graphics Processing Unit), a FPGA (Field-Programmable Gate Array), a DSP (Demand-Side Platform), or an ASIC (Application Specific Integrated Circuit). The processor 11 may be one of them, or may use a plurality of them in parallel.

The RAM 12 temporarily stores the computer program to be executed by the processor 11. The RAM 12 temporarily stores data that are temporarily used by the processor 11 when the processor 11 executes the computer program. The RAM 12 may be, for example, a D-RAM (Dynamic Random Access Memory) or a SRAM (Static Random Access Memory). Furthermore, another type of volatile memory may also be used instead of the RAM 12.

The ROM 13 stores the computer program to be executed by the processor 11. The ROM 13 may otherwise store fixed data. The ROM 13 may be, for example, a P-ROM (Programmable Read Only Memory) or an EPROM (Erasable Read Only Memory). Furthermore, another type of non-volatile memory may also be used instead of the ROM 13.

The storage apparatus 14 stores data that are stored by the information processing apparatus 10 for a long time. The storage apparatus 14 may operate as a temporary/transitory storage apparatus of the processor 11. The storage apparatus 14 may include, for example, at least one of a hard disk apparatus, a magneto-optical disk apparatus, a SSD (Solid State Drive), and a disk array apparatus.

The input apparatus 15 is an apparatus that receives an input instruction from a user of the information processing apparatus 10. The input apparatus 15 may include, for example, at least one of a keyboard, a mouse, and a touch panel. The input apparatus 15 may be configured as a portable terminal such as a smartphone and a tablet. The input apparatus 15 may be an apparatus that allows audio input/voice input, including a microphone, for example.

The output apparatus 16 is an apparatus that outputs information about the information processing apparatus 10 to the outside. For example, the output apparatus 16 may be a display apparatus (e.g., a display) that is configured to display the information about the information processing apparatus 10. The output apparatus 16 may be a speaker or the like that is configured to audio-output the information about the information processing apparatus 10. The output apparatus 16 may be configured as a portable terminal such as a smartphone and a tablet. The output apparatus 16 may be an apparatus that outputs information in a form other than an image. For example, the output apparatus 16 may be a speaker that audio-outputs the information about the information processing apparatus 10.

Although FIG. 1 illustrates the information processing system 10 including a plurality of apparatuses, all or a part of the functions may be realized or implemented in a single apparatus. In such a case, the information processing apparatus may include, for example, only the processor 11, the RAM 12, and the ROM 13. The other components (i.e., the storage apparatus 14, the input apparatus 15, and the output apparatus 16) may be provided in an external apparatus connected to the information processing apparatus, for example. In addition, in the information processing apparatus, a part of an arithmetic function may be realized by an external apparatus (e.g., an external server or cloud, etc.).

(Functional Configuration)

Next, with reference to FIG. 2, a functional configuration of the information processing apparatus 10 according to the first example embodiment will be described. FIG. 2 is a block diagram illustrating the functional configuration of the information processing apparatus according to the first example embodiment.

Figure 2:
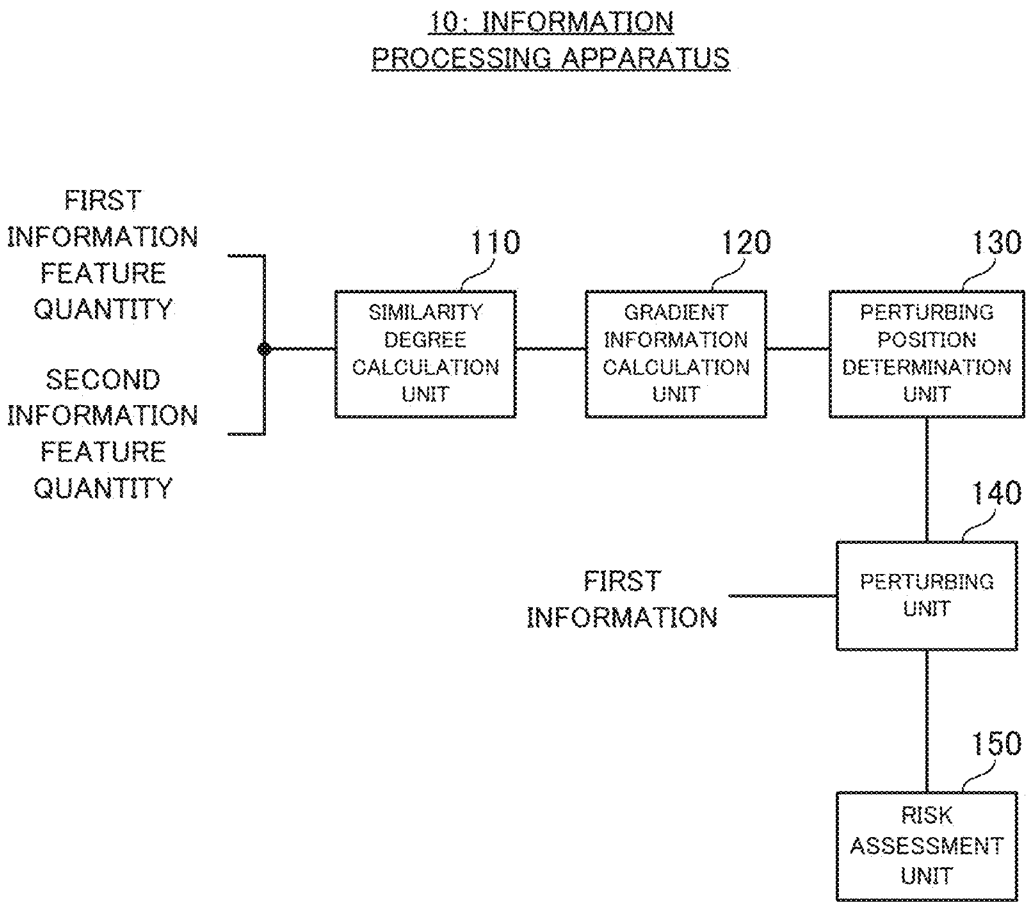
FIG. 2 is a block diagram illustrating a functional configuration of the information processing apparatus according to the first example embodiment.

As illustrated in FIG. 2, the information processing apparatus 10 according to the first example embodiment includes, as components for realizing the functions thereof, a similarity degree calculation unit 110, a gradient information calculation unit 120, a perturbing position determination unit 130, a perturbing unit 140, and a risk assessment unit 150. Each of the similarity degree calculation unit 110, the gradient information calculation unit 120, the perturbing position determination unit 130, the perturbing unit 140, and the risk assessment unit 150 may be a processing block realized or implemented by the processor 11 (see FIG. 1), for example. Each of the similarity degree calculation unit 110, the gradient information calculation unit 120, the perturbing position determination unit 130, the perturbing unit 140, and the risk assessment unit 150 may include a neural network.

The similarity degree calculation unit 110 is configured such that a feature quantity of first information (hereinafter referred to as a "first information feature quantity" as appropriate) and a feature quantity of second information (hereinafter referred to as a "second information feature quantity" as appropriated) are inputted thereto. Then, the similarity degree calculation unit 110 is configured to calculate a degree of similarity between the inputted first information feature quantity and second information feature quantity. A method of calculating the degree of similarity is not particularly limited, and existing techniques/technologies may be employed as appropriate. The degree of similarity may be a matching score obtained by collating/verifying the first information feature quantity with the second information feature quantity. A specific example of the first information and the second information will be described in detail in another example embodiment later.

The gradient information calculation unit 120 is configured to calculate gradient information indicating a gradient of the degree of similarity calculated by the similarity degree calculation unit 110.

A method of calculating the gradient information is not particularly limited, and existing techniques/technologies may be employed as appropriate. The gradient information may be information including a Jacobian of the degree of similarity. For example, when the degree of similarity between the first information feature quantity f(Xa) and the second information feature quantity f(Xt) is set to L{f(Xa), f(Xt)}, the gradient information ∇L(Xa, Xt) may be calculated as in the following Equation (1).

[Equation 1]

$$\nabla\mathcal{L}(X_a, X_t) = \left[\frac{\partial\mathcal{L}(f(X_a), f(X_t))}{\partial X_{a_i}}\right]_{i=1,\ldots,M} \tag{1}$$

wherein M is the dimensionality of X.

The perturbing position determination unit 130 is configured to determine an element serving as a perturbing target in the first information, on the basis of the gradient information calculated by the gradient information calculation unit 120. For example, the perturbing position determination unit 130 determines at least one element to be perturbed, from a plurality of elements included in the first information. The "perturbation" here is a noise applied to increase a degree of similarity between the first information and the second information. For example, a case where the gradient information indicated by the Equation (1) is positive, means that the degree of similarity between the first information and the second information is increased by perturbing the element Xa. A more specific techniques/technology when determining the element serving as the perturbing target will be described in detail in another example embodiment later.

The perturbing unit 140 is configured to perturb or apply the perturbation to the element determined by the perturbing position determination unit 130. That is, the perturbing unit 140 is configured to generate the perturbed first information (hereinafter, appropriately referred to as an "adversarial sample") by perturbing a part of the elements of the first information. In a case of using the adversarial sample generated in this way, for example, the degree of similarity between the first information and the second information is higher than that in a case of not applying the perturbation. That is, the adversarial sample generated by the perturbing unit 140 is easily misrecognized as the second information in authentication processing.

The risk assessment unit 150 is configured to assess a risk in the authentication processing (in other words, a potential risk in an authentication model or an authenticator that performs the authentication processing). More specifically, the risk assessment unit 150 assesses the risk in the authentication processing on the basis of a result of the authentication processing using the adversarial sample generated by the perturbing unit 140. For example, the risk assessment unit 150 may assess a possibility that the generated adversarial sample (i.e., the perturbed first information) is recognized as the second information. A specific assessment method by the risk assessment unit 150 will be described in detail in another example embodiment later.

The risk assessment unit 150 may be provided separately from an apparatus that generates the adversarial sample. For example, an adversarial sample generation apparatus including the similarity degree calculation unit 110, the gradient information calculation unit 120, the perturbing position determination unit 130, and the perturbing unit 140, and a risk assessment apparatus including the risk assessment unit 150 may be configured as separate apparatuses.

The authentication processing may be performed by an authentication apparatus that is provided separately from the information processing apparatus 10 according to the present exemplary example embodiment. In this instance, the adversarial sample generated by the perturbing unit 140 may be outputted to the authentication apparatus, and the risk assessment unit 150 may assess the risk by using an authentication result inputted from the authentication apparatus. Alternatively, the risk assessment unit 150 may have a function of performing the authentication processing. That is, the risk assessment unit 150 is configured to perform the authentication processing by itself and assess the risk of the authentication processing on the basis of the authentication result.

(Flow of Operation)

Next, with reference to FIG. 3, a flow of overall operation by the information processing apparatus 10 according to the first example embodiment will be described. FIG. 3 is a flowchart illustrating the flow of the operation of the information processing apparatus according to the first example embodiment.

Figure 3:
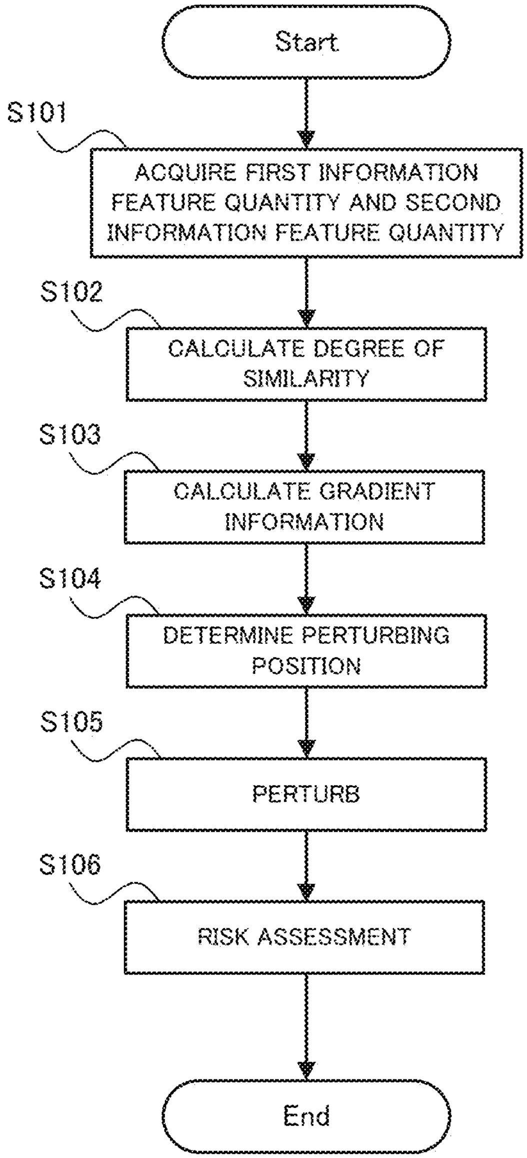
FIG. 3 is a flowchart illustrating a flow of operation of the information processing apparatus according to the first example embodiment.

As illustrated in FIG. 3, when the operation of the information processing apparatus 10 according to the first example embodiment is started, first, the similarity degree calculation unit 110 acquires the first information feature quantity and the second information feature quantity (step S101). Then, the similarity degree calculation unit 110 calculates the degree of similarity between the acquired first information feature quantity and second information feature quantity (step S102). Information about the degree of similarity calculated by the similarity degree calculation unit 110 is outputted to the gradient information calculation unit 120.

Subsequently, the gradient information calculation unit 120 calculates the gradient information indicating the gradient of the degree of similarity calculated by the similarity degree calculation unit 110 (step S103). The gradient information calculated by the gradient information calculating unit 120 is outputted to the perturbing position determination unit 130.

Subsequently, the perturbing position determination unit 130 determines the element to be perturbed in the first information, on the basis of the gradient information calculated by the gradient information calculation unit 120 (step S104). Information about the element determined by the perturbing position determination unit 130 is outputted to the perturbing unit 140.

Subsequently, the perturbing unit 140 perturbs the element determined by the perturbing position determination unit 130 (step S105). That is, the first information is perturbed to generate the adversarial sample. The adversarial sample generated by perturbator 140 is used in the authentication processing.

Subsequently, the risk assessment unit 150 assesses the risk in the authentication processing on the basis of the authentication result of the authentication processing using the adversarial sample generated by the perturbing unit 140 (step S106). The risk assessment unit 150 may output a risk assessment result.

Technical Effect

Next, a technical effect obtained by the information processing apparatus 10 according to the first example embodiment will be described.

As described in FIG. 1 to FIG. 3, in the information processing apparatus 10 according to the first example embodiment, the perturbation is applied on the basis of the degree of similarity between the two pieces of information, thereby generating the adversarial sample. The risk of the authentication processing is assessed on the basis of the result of the authentication processing using the generated adversarial sample. In this way, it is possible to properly assess the risk of the authentication processing on an adversarial input. Specifically, it is possible to assess what type of risk is included in the authentication processing, to an attack aiming to intentionally obtain an incorrect result.

For a method of generating the adversarial sample, JSMA (Jacobian-base Saliency Map Attack) is known. This method assumes class-classification processing (i.e., processing in which a classification probability vector is obtained as a processing result), and thus, it cannot be directly applied when the adversarial sample is generated for the authentication processing (i.e., processing in which the degree of similarity is obtained as a processing result). In the information processing apparatus according to the present example embodiment, however, the adversarial sample suitable for the authentication processing is generated, and it is thus possible to properly assess the risk in the authentication processing.

Second Example Embodiment

The information processing apparatus 10 according to a second example embodiment will be described with reference to FIG. 4 and FIG. 5. The second example embodiment is partially different from the first example embodiment only in the configuration and operation, and may be the same as the first example embodiment in the other parts. For this reason, a part that is different from the first example embodiment will be described in detail below, and a description of the other overlapping parts will be omitted as appropriate.

(Functional Configuration)

First, with reference to FIG. 4, a functional configuration of the information processing apparatus 10 according to the second example embodiment will be described. FIG. 4 is a block diagram illustrating the functional configuration of the information processing apparatus according to the second example embodiment. In FIG. 4, the same components as those illustrated in FIG. 2 carry the same reference numerals.

Figure 4:
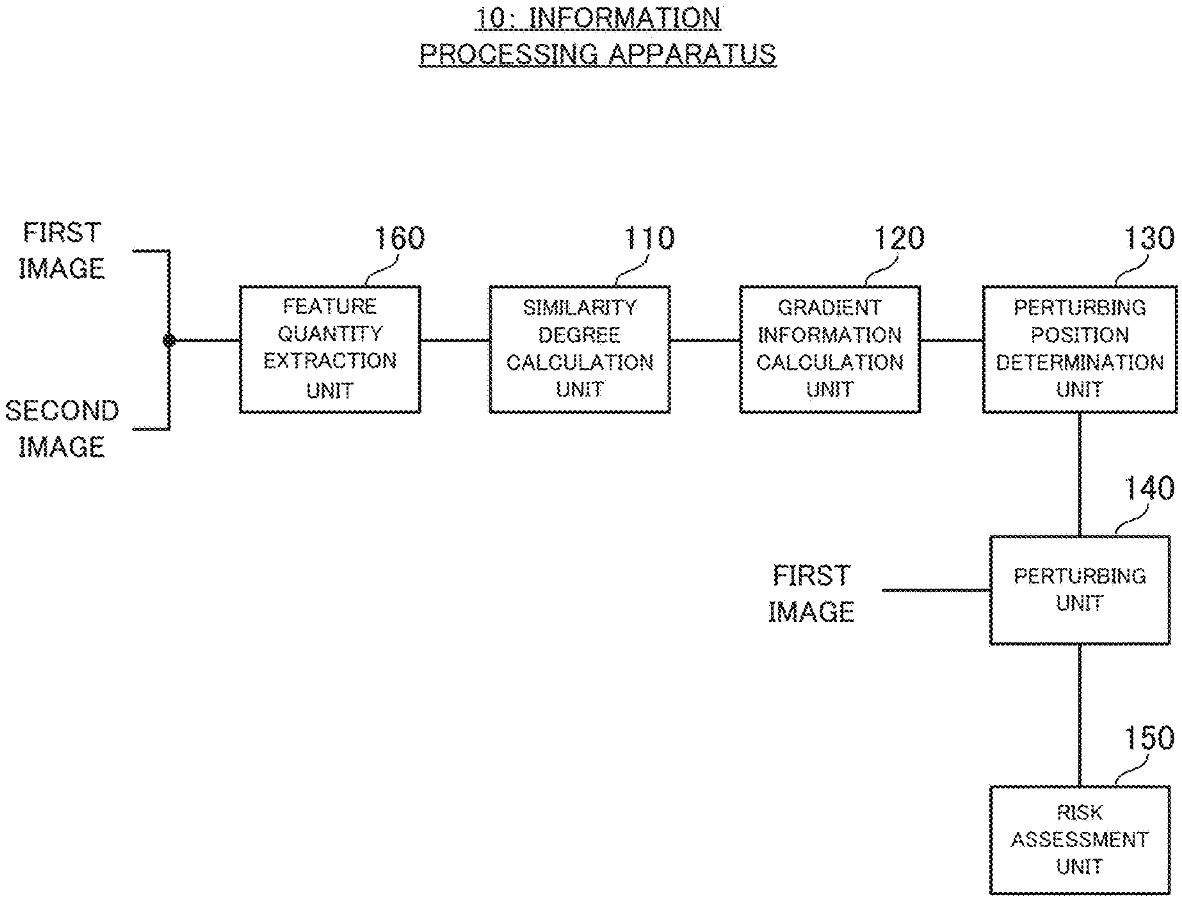
FIG. 4 is a block diagram illustrating a functional configuration of an information processing apparatus according to a second example embodiment.

As illustrated in FIG. 4, the information processing apparatus 10 according to the second example embodiment includes, as components for realizing the functions thereof, the similarity degree calculation unit 110, the gradient information calculation unit 120, the perturbing position determination unit 130, the perturbing unit 140, the risk assessment unit 150, and a feature quantity extraction unit 160. That is, the information processing apparatus 10 according to the second example embodiment further includes the feature quantity extraction unit 160 in addition to the configuration in the first example embodiment (see FIG. 2). The feature quantity extraction unit 160 may be a processing block realized or implemented by the processor 11 (see FIG. 1), for example.

The feature quantity extraction unit 160 is configured such that a first image that is a specific example of the first information and a second image that is a specific example of the second information are inputted thereto. The first image is an image including a first living body, and the second image is an image including ae second living body. The first image and the second image may be, for example, a face image including a face of a living body, and an iris image including an iris. Then, the feature quantity extraction unit 160 is configured to extract feature quantities from the first image and the second image. That is, the feature quantity extraction unit 160 is configured to extract the feature quantity about the first living body included in the first image, and the feature quantity about the second living body included in the second image. Each of the feature quantities extracted by the feature quantity extraction unit 160 is configured to be inputted to the similarity degree calculation unit 110, as the first information feature quantity and the second information feature quantity.

(Flow of Operation)

Next, with reference to FIG. 5, a flow of overall operation of the information processing apparatus 10 according to the second example embodiment will be described. FIG. 5 is a flowchart illustrating the flow of the operation of the information processing apparatus according to the second example embodiment. In FIG. 5, the same steps as those illustrated in FIG. 3 carry the same reference numerals.

Figure 5:
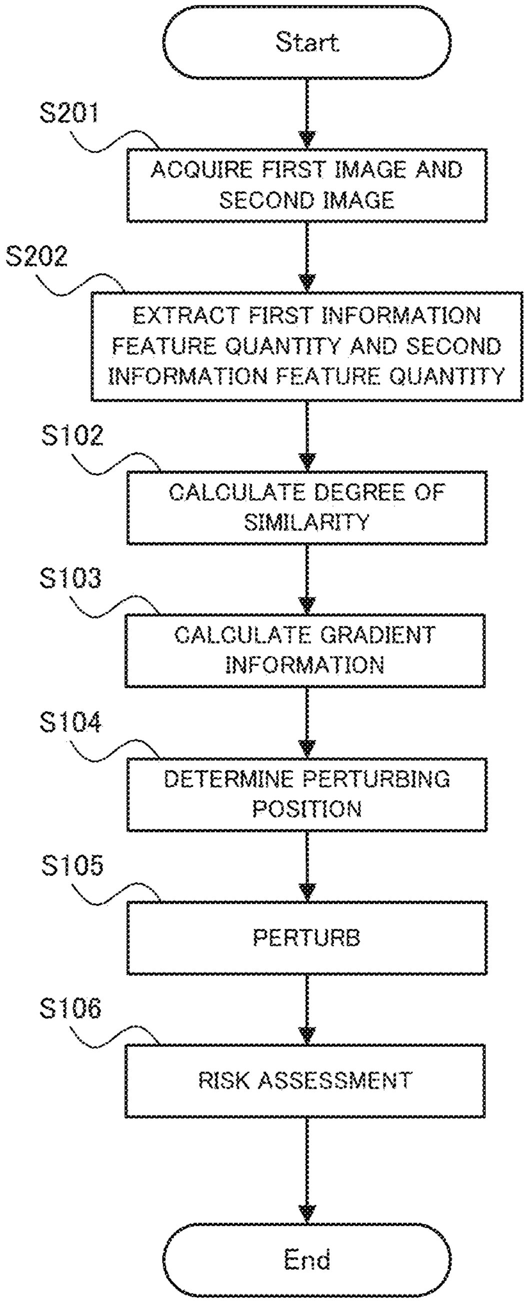
FIG. 5 is a flowchart illustrating a flow of operation of the information processing apparatus according to the second example embodiment.

As illustrated in FIG. 5, when the operation of the information processing apparatus 10 according to the second example embodiment is started, first, the feature quantity extraction unit 160 acquires the first image and the second image (step S201). Then, the feature quantity extraction unit 160 extracts the first information feature quantity from the first image, and extracts the second information feature quantity from the second image (step S202). Information about the feature quantity extracted by the feature quantity extraction unit 160 is outputted to the similarity degree calculation unit 110.

Subsequently, the similarity degree calculation unit 110 calculates the degree of similarity between the first information feature quantity and the second information feature quantity extracted by the feature quantity extraction unit 160 (step S102). The information about the degree of similarity calculated by the similarity degree calculation unit 110 is outputted to the gradient information calculation unit 120.

Subsequently, the gradient information calculation unit 120 calculates the gradient information indicating the gradient of the degree of similarity calculated by the similarity degree calculation unit 110 (step S103). The gradient information calculated by the gradient information calculating unit 120 is outputted to the perturbing position determination unit 130.

Subsequently, the perturbing position determination unit 130 determines the element to be perturbed in the first information, on the basis of the gradient information calculated by the gradient information calculation unit 120 (step S104). The element here may be a pixel in the first image. The perturbing position determination unit 130 may perform processing for determining the position of a pixel to be perturbed, from a plurality of pixels included in the first image, for example. The information about the element determined by the perturbing position determination unit 130 is outputted to the perturbing unit 140.

Subsequently, the perturbing unit 140 perturbs the element determined by the perturbing position determination unit 130 (step S105). That is, the perturbing unit 140 perturbs the pixel of the first image determined by the perturbing position determination unit 130, thereby generating the adversarial sample. The adversarial sample generated by the perturbing unit 140 is used in the authentication processing.

Subsequently, the risk assessment unit 150 assesses the risk in the authentication processing on the basis of the authentication result of the authentication processing using the adversarial sample generated by the perturbing unit 140 (step S106). The risk assessment unit 150 may output the risk assessment result.

Technical Effect

Next, a technical effect obtained by the information processing apparatus 10 according to the second example embodiment will be described.

As described in FIG. 4 and FIG. 5, in the information processing apparatus 10 according to the second example embodiment, the feature quantities are extracted from the first image and the second image, and the perturbation is applied on the basis of the degree of similarity between the feature quantities, thereby generating the adversarial sample. In this way, it is possible to properly assess the risk of the authentication processing using the image. For example, it is possible to properly assess the risk to the adversarial input, for face authentication using the face image and iris authentication using the iris image.

Third Example Embodiment

The information processing apparatus 10 according to a third example embodiment will be described with reference to FIG. 6. The third example embodiment describes a specific example of an operation when determining a perturbing position in the first and second example embodiments (i.e., an operation corresponding to the step S104 in FIG. 3), and may be the same as the first and second example embodiments in the other parts. For this reason, a part that is different from each of the example embodiments described above will be described in detail below, and a description of the other overlapping parts will be omitted as appropriate.

(Perturbing Position Determination Operation)

First, with reference to FIG. 6, a flow of a perturbing position determination operation (i.e., an operation when determining the element to be perturbed) by the information processing apparatus 10 according to the third example embodiment will be described. FIG. 6 is a flowchart illustrating the flow of the perturbing position determination operation by the information processing apparatus according to the third example embodiment.

Figure 6:
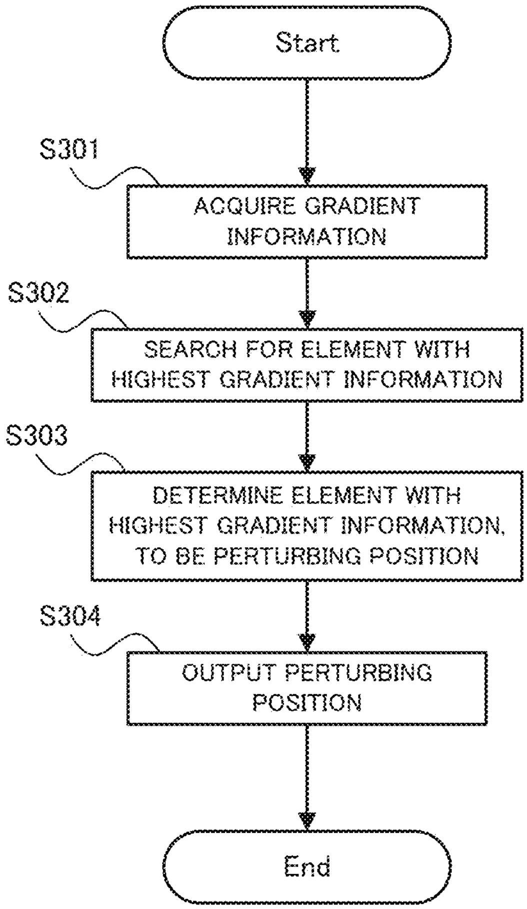
FIG. 6 is a flowchart illustrating a flow of a perturbing position determination operation by an information processing apparatus according to a third example embodiment.

As illustrated in FIG. 6, in the perturbing position determination operation by the information processing apparatus 10 according to the third example embodiment, first, the perturbing position determination unit 130 acquires the gradient information (i.e., the gradient information about the gradient of the degree of similarity between the first information feature quantity and the second information feature quantity) calculated by the gradient information calculation unit 120 (step S301). Then, the perturbing position determination unit 130 searches for one element with the highest gradient information on the basis of the gradient information calculated by the gradient information calculation unit 120 (step S302).

Subsequently, the perturbing position determination unit 130 determines the one element with the highest gradient information obtained as a search result, to be the element to be perturbed (i.e., the perturbing position) (step S303). When there are a plurality of elements with the highest gradient information, the perturbing position determination unit 130 may select one of the plurality of elements, and may determine to be the elements to be perturbed. Thereafter, the perturbing position determination unit 130 outputs the information about the element to be perturbed to the perturbing unit 140 (step S304).

Technical Effect

Next, a technical effect obtained by the information processing apparatus 10 according to the third example embodiment will be described.

As described in FIG. 6, in the information processing apparatus 10 according to the third example embodiment, one element with the highest gradient information is determined to be the perturbing target. In this way, it is possible to determine the perturbing position, easily and properly, on the basis of the gradient information. Therefore, it is possible to properly generate the adversarial sample and to assess the risk of the authentication processing.

Fourth Example Embodiment

The information processing apparatus 10 according to a fourth example embodiment will be described with reference to FIG. 7. The fourth example embodiment describes a specific example of the perturbing position determination operation, as in the third example embodiment described above, and may be the same as the first and second example embodiments in the other parts. For this reason, a part that is different from each of the example embodiments described above will be described in detail below, and a description of the other overlapping parts will be omitted as appropriate.

(Perturbing Position Determination Operation)

First, with reference to FIG. 7, a flow of a perturbing position operation by the information processing apparatus 10 according to the fourth example embodiment will be described. FIG. 7 is a flowchart illustrating the flow of the perturbing position determination operation by the information processing apparatus according to the fourth example embodiment.

Figure 7:
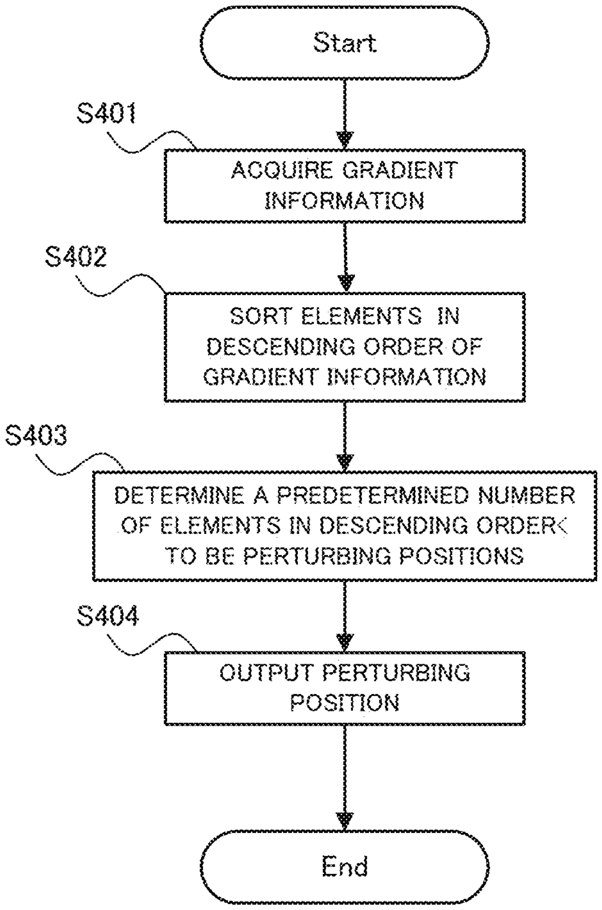
FIG. 7 is a flowchart illustrating a flow of a perturbing position determination operation by an information processing apparatus according to a fourth example embodiment.

As illustrated in FIG. 7, in the perturbing position determination operation by the information processing apparatus 10 according to the fourth example embodiment, first, the perturbing position determination unit 130 acquires the gradient information (i.e., the gradient information about the gradient of the degree of similarity between the first information feature quantity and the second information feature quantity) calculated by the gradient information calculation unit 120 (step S401). Then, the perturbing position determination unit 130 sorts the elements in descending order of the gradient information calculated by the gradient information calculating unit 120 (step S402).

Subsequently, the perturbing position determining unit 130 determines a predetermined number of elements in descending order of the gradient information, to be the elements to be perturbed (i.e., the perturbing positions) (step S403). Here, the "predetermined number" is the number of the elements to be selected as the perturbing positions, and may be, for example, a value that is arbitrarily settable by a user or the like. For example, when the predetermined number is set to "3", the perturbing position determining unit 130 may determine an element with the highest gradient information, an element with the second highest element, and an element with the second highest element, to be the perturbing positions. Thereafter, the perturbing position determination unit 130 outputs the information about the elements to be perturbed to the perturbing unit 140 (step S404).

Technical Effect

Next, a technical effect obtained by the information processing apparatus 10 according to the fourth example embodiment will be described.

As described in FIG. 7, in the information processing apparatus 10 according to the fourth example embodiment, the predetermined number of elements are determined to be the perturbing targets in descending order of the gradient information. In this way, it is possible to determine the perturbing position, easily and properly, on the basis of the gradient information. Therefore, it is possible to properly generate the adversarial sample and to assess the risk of the authentication processing.

Fifth Example Embodiment

Figure 8:
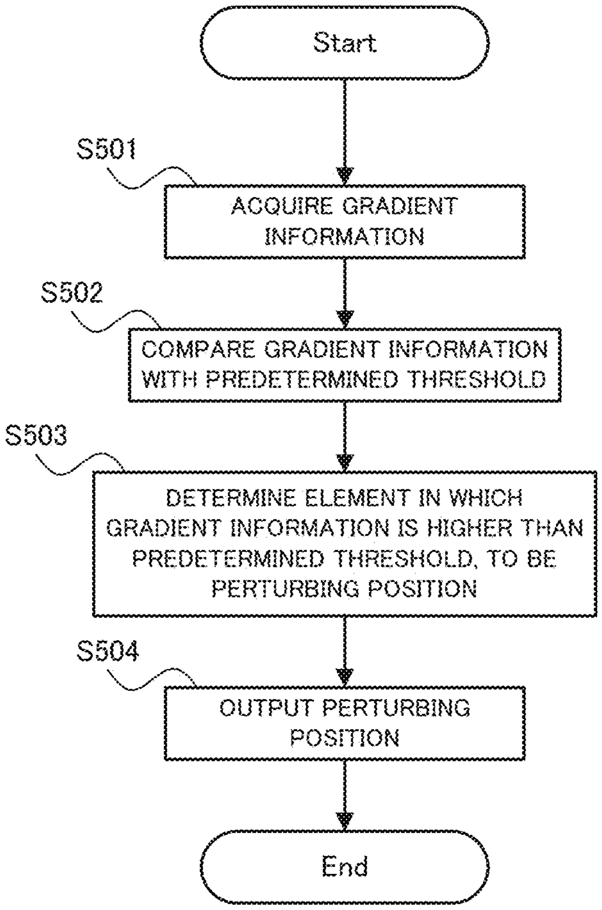
FIG. 8 is a flowchart illustrating a flow of a perturbing position determination operation by an information processing apparatus according to a fifth example embodiment.

With reference to FIG. 8, an information processing apparatus 10 according to a fifth example embodiment will be described. The fifth example embodiment describes a specific example of the perturbing position determination operation, as in the third and fourth example embodiments described above, and may be the same as the first and second example embodiments in the other parts. For this reason, a part that is different from each of the example embodiments described above will be described in detail below, and a description of the other overlapping parts will be omitted as appropriate.

(Perturbing Position Determination Operation)

First, with reference to FIG. 8, a flow of a perturbing position operation by the information processing apparatus 10 according to the fifth example embodiment will be described. FIG. 8 is a flowchart illustrating the flow of the perturbing position determination operation by the information processing apparatus according to the fifth example embodiment.

As illustrated in FIG. 8, in the perturbing position determination operation by the information processing apparatus 10 according to the fifth example embodiment, first, the perturbing position determination unit 130 acquires the gradient information (i.e., the gradient information about the gradient of the degree of similarity between the first information feature quantity and the second information feature quantity) calculated by the gradient information calculation unit 120 (step S501). Then, the perturbing position determination unit 130 compares the gradient information calculated by the gradient information calculating unit 120 with a predetermined threshold (step S502). The "predetermined threshold" here is a threshold set in advance in order to determine the perturbing position.

Subsequently, the perturbing position determination unit 130 determines an element in which the gradient information is higher than the predetermined threshold, to be the element to be perturbed (i.e., the perturbing position) (step S503). Therefore, for example, when it is desired to determine a relatively small number of elements to be the perturbing positions, the predetermined threshold may be set as a higher value. Conversely, when it is desired to determine a relatively large number of elements to be perturbing positions, the predetermined threshold may be set as a lower value. Thereafter, the perturbing position determination unit 130 outputs the information about the element to be perturbed to the perturbing unit 140 (step S504).

In the step S503, when there is no gradient information that is lower than the predetermined threshold (i.e., when all the pieces of gradient information are lower than the predetermined threshold), the predetermined threshold may be reset to a lower value, and then, the steps S502 and S503 may be performed again. Alternatively, when there is no gradient information that is lower than the predetermined threshold, the perturbing position may be determined by the method already described in the third and fourth example embodiments.

Technical Effect

Next, a technical effect obtained by the information processing apparatus 10 according to the fifth example embodiment will be described.

As described in FIG. 8, in the information processing apparatus 10 according to the fifth example embodiment, the element in which the gradient information is higher than the predetermined threshold, is determined to be the perturbing target. In this way, it is possible to determine the perturbing position, easily and properly, on the basis of the gradient information. Therefore, it is possible to properly generate the adversarial sample and to assess the risk of the authentication processing.

Sixth Example Embodiment

Figure 9:
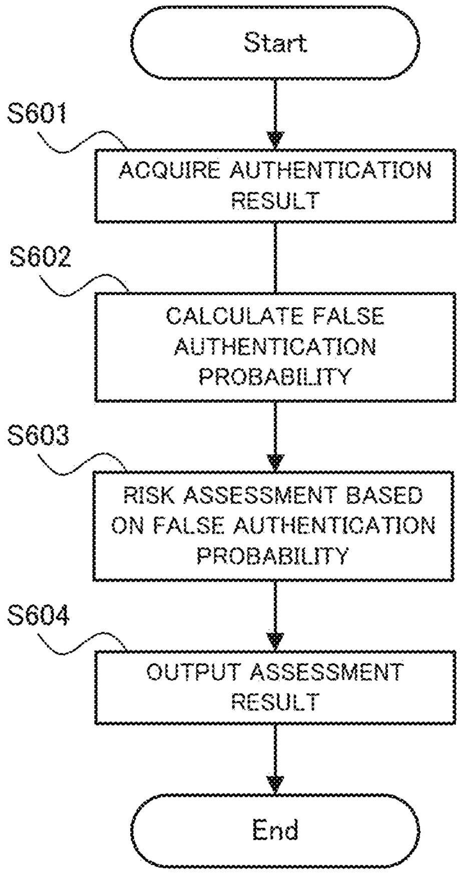
FIG. 9 is a flowchart illustrating a flow of a risk assessment operation by an information processing apparatus according to a sixth example embodiment.

With reference to FIG. 9, the information processing apparatus 10 according to a sixth example embodiment will be described. The sixth example embodiment is partially different from the first to fifth example embodiments only in the operation, and may be the same as the first to fifth example embodiments in the other parts. For this reason, apart that is different from each of the example embodiments described above will be described in detail below, and a description of the other overlapping parts will be omitted as appropriate.

(Risk Assessment Operation)

First, with reference to FIG. 9, a flow of a risk assessment operation (i.e., an operation when assessing the risk by using the generated adversarial sample) by the information processing apparatus 10 according to the sixth example embodiment will be described. FIG. 9 is a flowchart illustrating the flow of the risk assessment operation by the information processing apparatus according to the sixth example embodiment.

As illustrated in FIG. 9, in the risk assessment operation by the information processing apparatus 10 according to the sixth example embodiment, first, the risk assessment unit 150 acquires the result of the authentication processing using the adversarial sample (i.e., the perturbed first information) (step S601). Then, the risk assessment unit 150 calculates a false authentication probability on the basis of the acquired authentication result (step S602). The false authentication probability is a probability that an incorrect authentication result is obtained, and it may be calculated by dividing the number of times of false authentication, by a total number of the authentication, for example.

Subsequently, the risk assessment unit 150 assesses the risk of the authentication processing on the basis of the calculated false authentication probability (step S603). For example, the risk assessment unit 150 may determine that the risk is higher as the false authentication probability is higher. Thereafter, the risk assessment unit 150 outputs the assessment result (step S604). The risk assessment unit 150 may output the false authentication probability together with the assessment result.

Technical Effect

Next, a technical effect obtained by the information processing apparatus 10 according to the sixth example embodiment will be described.

As described in FIG. 9, in the information processing apparatus 10 according to the sixth example embodiment, the risk is assessed on the basis of the false authentication probability calculated from the authentication result. In this way, it is possible to properly assess the risk that the incorrect authentication result is outputted for the adversarial input.

Seventh Example Embodiment

The information processing apparatus 10 according to a seventh example embodiment will be described with reference to FIG. 10 to FIG. 12. The seventh example embodiment is partially different from the first to sixth example embodiments only in the configuration and operation, and may be the same as the first to sixth example embodiments in the other parts. For this reason, a part that is different from each of the example embodiments described above will be described in detail below, and a description of the other overlapping parts will be omitted as appropriate.

(Functional Configuration)

First, with reference to FIG. 10, a functional configuration of the information processing apparatus 10 according to the seventh example embodiment will be described. FIG. 10 is a block diagram illustrating the functional configuration of the information processing apparatus according to the seventh example embodiment. In FIG. 10, the same components as those illustrated in FIG. 2 carry the same reference numerals.

Figure 10:
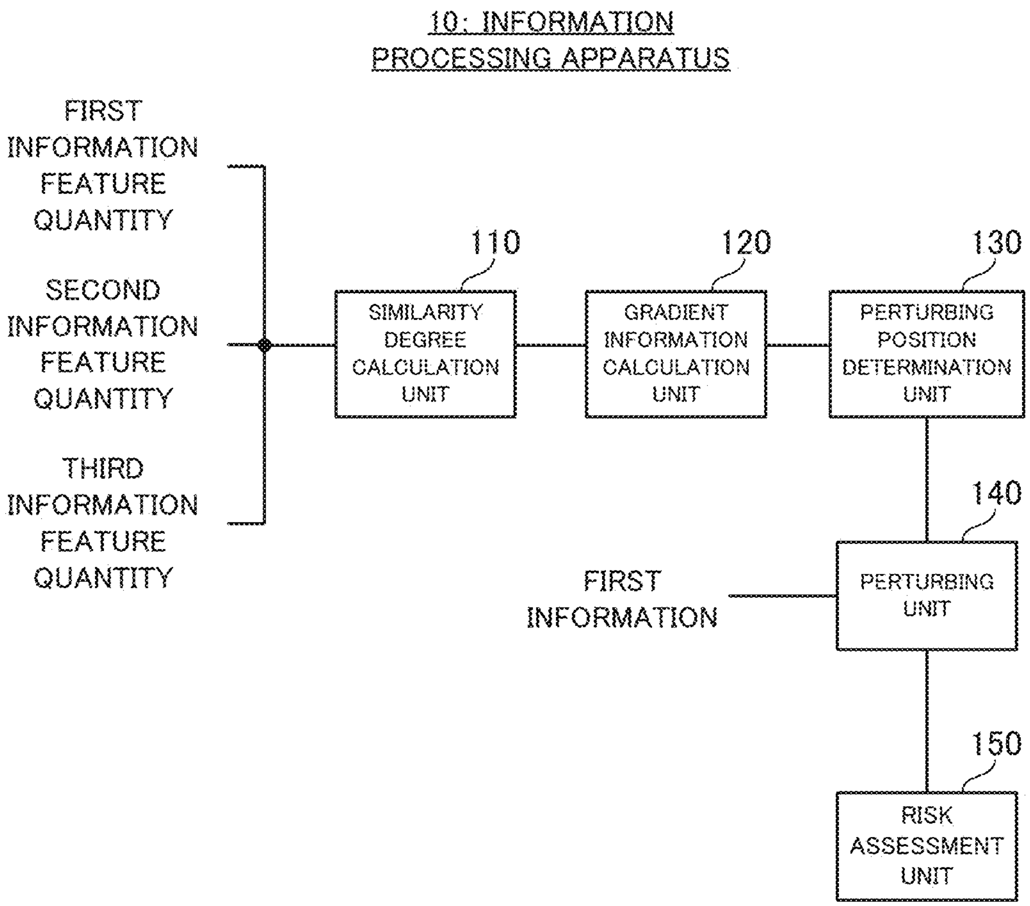
FIG. 10 is a block diagram illustrating a functional configuration of an information processing apparatus according to a seventh example embodiment.

As illustrated in FIG. 10, the information processing apparatus 10 according to the seventh example embodiment includes, as components for realizing the functions thereof, the similarity degree calculation unit 110, the gradient information calculation unit 120, the perturbing position determination unit 130, the perturbing unit 140, and the risk assessment unit 150. In particular, the similarity degree calculation unit 110 according to the seventh example embodiment is configured such that the third information feature quantity is inputted thereto, in addition to the first information feature quantity and the second information feature quantity.

The similarity degree calculation unit 110 according to the seventh example embodiment is configured such that a feature quantity of third information (hereinafter referred to as a "third information feature quantity") is inputted thereto, in addition to the feature quantity of the first information and the feature quantity of the second information. Then, the similarity degree calculation unit 110 is configured to calculate not only the degree of similarity between the first information feature quantity and the second information feature quantity described above (hereinafter referred to as a "first degree of similarity" as appropriate), but also a degree of similarity between the first information feature quantity and the third information feature quantity (hereinafter referred to as a "second degree of similarity" as appropriate).

The gradient information calculation unit 120 according to the seventh example embodiment is configured to calculate not only the gradient information about a gradient of the first degree of similarity described above (hereinafter referred to as "first gradient information" as appropriate), but also the gradient information about a gradient of the second degree of similarity (hereinafter referred to as "second gradient information" as appropriate). For example, when the degree of similarity between the first information feature quantity f(Xa) and the third information feature quantity f(Xs) is set to L{f(Xa), f(Xs)}, the gradient information ∇L(Xa, Xs) may be calculated as in the following Equation (2).

[Equation 2]

$$\nabla \mathcal{L}(X_a, X_s) = \left[\frac{\partial \mathcal{L}(f(X_a), f(X_s))}{\partial X_{a_i}}\right]_{i\in 1,\ldots,M} \tag{2}$$

The perturbing position determination unit 130 according to the seventh example embodiment is configured to determine the element serving as the perturbing target in the first information, on the basis of the first gradient information and the second gradient information calculated by the gradient information calculation unit 120. That is, the perturbing position determination unit 130 determines the element serving as the perturbing target, on the basis of the two pieces of gradient information. A method of determining the element serving as the perturbing target using the two pieces of gradient information, will be described in detail in another example embodiment later.

In addition to the above configuration, the information processing apparatus 10 according to the seventh example embodiment may include the feature quantity extraction unit 160 described in the second example embodiment. In this instance, in addition to the first image and the second image, a third image (i.e., an image including a third living body) may be inputted to the feature quantity extraction unit 160. Then, the feature quantity extraction unit 160 may be configured to extract the first information feature quantity from the first image, to extract the second information quantity from the second image, and to extract the third information feature quantity from the third image.

(Example of Possible Attack)

Figure 11:
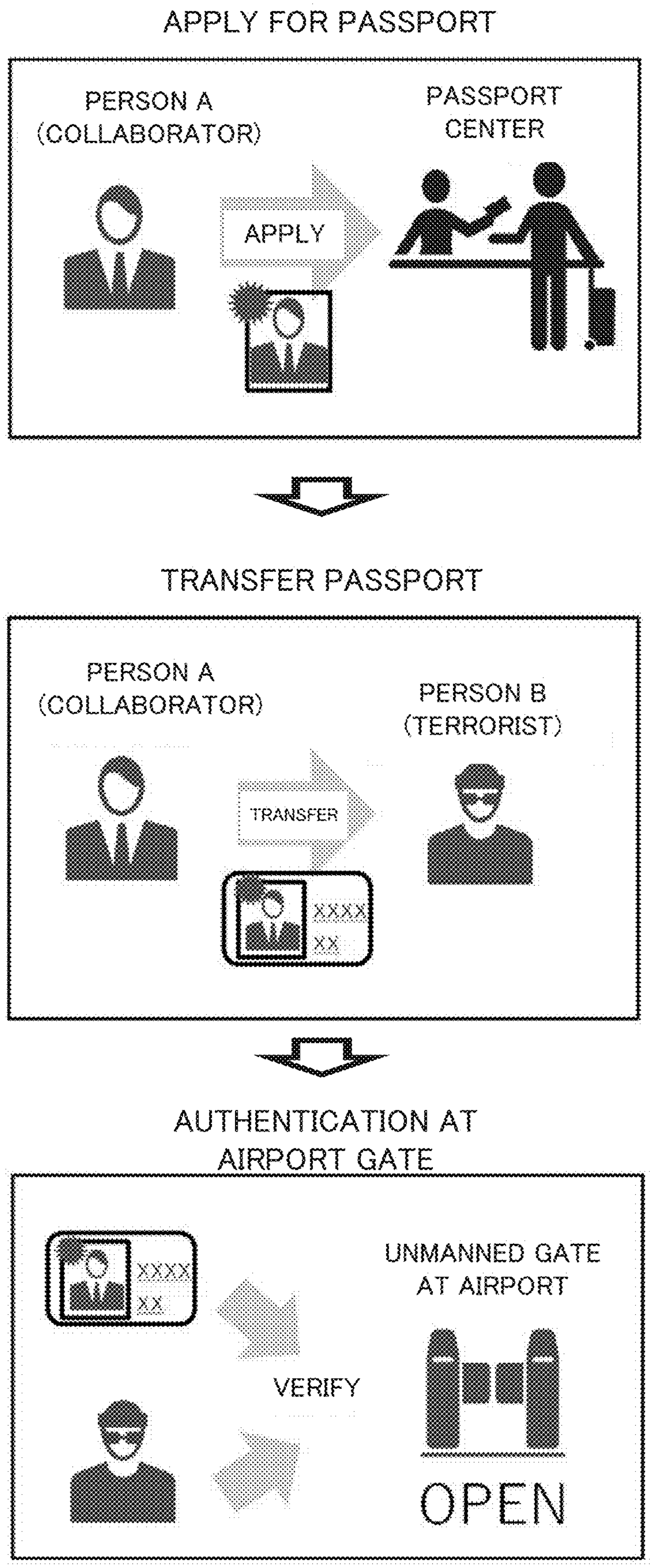
FIG. 11 is a conceptual diagram illustrating an example of an attack on a face authentication gate at an airport.

Referring now to FIG. 11, an example of an attack that is assumed in the information processing apparatus 10 according to the seventh example embodiment will be described. FIG. 11 is a conceptual diagram illustrating an example of an attack on a face authentication gate at an airport.

As illustrated in FIG. 11, the information processing apparatus 10 according to the seventh example embodiment may assess a risk in face authentication at the airport. For example, let us assume that there are a collaborator, person A, and a terrorist, person B. In this case, first, the person A submits a photograph to apply for a passport. The photograph submitted at this time is one that looks like the person A to the human eye, but is a photograph that looks similar to both the person A and the person B to an authenticator.

Then, the person A transfers the passport to the person B. Then, the person B presents the passport transferred from the person A and tries to pass through an unmanned gate at the airport (a gate that permits a passage by the face authentication). In this case, the authentication processing is performed by using the photograph (registered image) submitted in the application of the passport, but as already explained, the registered image also looks similar to the person B. Therefore, at the unmanned gate, the authentication processing of the person B is successful (i.e., is erroneously authenticated and identified as the person A), and consequently unauthorized breakthrough is made by the person B.

As described above, in the authentication processing, photographs that look similar to a plurality of users can be more threatening. Therefore, when assessing the risk of the authentication processing, it is preferable to use a degree of similarity with the plurality of users. In contrast, in the information processing apparatus 10 according to the seventh example embodiment, the degree of similarity with the two pieces of information (i.e., the degree of similarity between the first information and the second information, and the degree of similarity between the first information and the third information) is considered. Therefore, it is possible to assess the risk that takes into account the example of the attack by the plurality of users as described above.

(Flow of Operation)

Next, with reference to FIG. 12, a flow of overall operation by the information processing apparatus 10 according to the seventh example embodiment will be described. FIG. 12 is a flowchart illustrating the flow of the operation of the information processing apparatus according to the seventh example embodiment. In FIG. 12, the same steps as those illustrated in FIG. 3 carry the same reference numerals.

Figure 12:
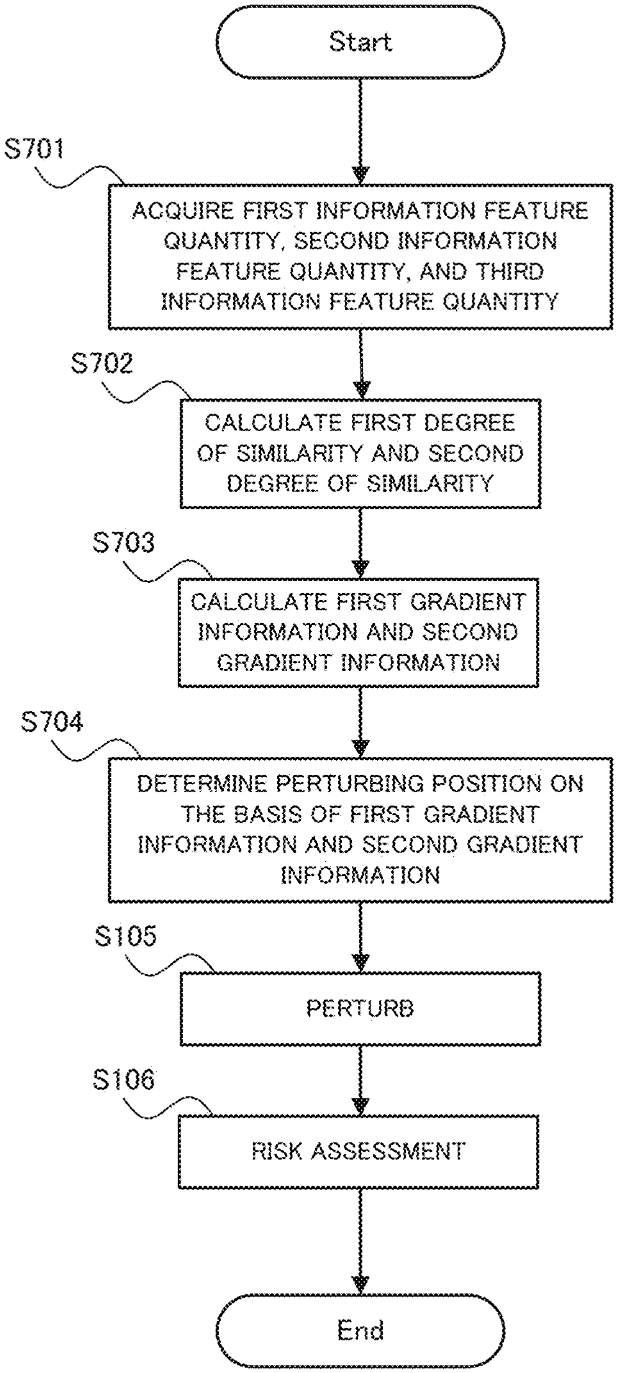
FIG. 12 is a flowchart illustrating a flow of operation of the information processing apparatus according to the seventh example embodiment.

As illustrated in FIG. 12, when the operation of the information processing apparatus 10 according to the seventh example embodiment is started, first, the similarity degree calculation unit 110 acquires the first information feature quantity, the second information feature quantity, and the third information feature quantity (step S701). Then, the similarity degree calculation unit 110 calculates the first degree of similarity, which is the degree of similarity between the first information feature quantity and the second information feature quantity, and the second degree of similarity, which is the degree of similarity between the first information feature quantity and the third information feature quantity (step S702). Information about the first and second degrees of similarity calculated by the similarity degree calculation unit 110 is outputted to the gradient information calculation unit 120.

Subsequently, the gradient information calculation unit 120 calculates the first gradient information indicating the gradient of the first degree of similarity and the second gradient information indicating the gradient of the second degree of similarity that are calculated by the similarity degree calculation unit 110 (step S703). The first gradient information and the second gradient information calculated by the gradient information calculating unit 120 are outputted to the perturbing position determination unit 130.

Subsequently, the perturbing position determining unit 130 determines the element to be perturbed in the first information, on the basis of the first gradient information and the second gradient information calculated by the gradient information calculation unit 120 (step S704). The information about the element determined by the perturbing position determination unit 130 is outputted to the perturbing unit 140.

Subsequently, the perturbing unit 140 perturbs the element determined by the perturbing position determination unit 130 (step S105). That is, the first information is perturbed to generate the adversarial sample. The adversarial sample generated by perturbator 140 is used in the authentication processing.

Subsequently, the risk assessment unit 150 assesses the risk in the authentication processing on the basis of the authentication result of the authentication processing using the adversarial sample generated by the perturbing unit 140 (step S106). The risk assessment unit 150 may output the risk assessment result.

Technical Effect

Next, a technical effect obtained by the information processing apparatus 10 according to the seventh example embodiment will be described.

As described in FIG. 10 to FIG. 12, in the information processing apparatus 10 according to the seventh example embodiment, the adversarial sample is generated in view of the third information, in addition to the first information and the second information. Therefore, as compared with a case of considering only the first information and the second information, it is possible to generate the adversarial sample, more properly. For example, it is possible to generate the adversarial sample that takes into account both the source image and the target image described above. Therefore, it is possible to assess the risk of the authentication processing, more properly.

Eighth Example Embodiment

The information processing apparatus 10 according to an eighth example embodiment will be described with reference to FIG. 13. The eighth example embodiment describes a specific example of the perturbing position determination operation in the seventh example embodiment described above, and may be the same as the first to seventh example embodiments in the other parts. For this reason, a part that is different from each of the example embodiments described above will be described in detail below, and a description of the other overlapping parts will be omitted as appropriate.

(Perturbing Position Determination Operation)

First, with reference to FIG. 13, a flow of a perturbing position operation by the information processing apparatus 10 according to the eighth example embodiment will be described. FIG. 13 is a flowchart illustrating the flow of the perturbing position determination operation by the information processing apparatus according to the eighth example embodiment.

Figure 13:
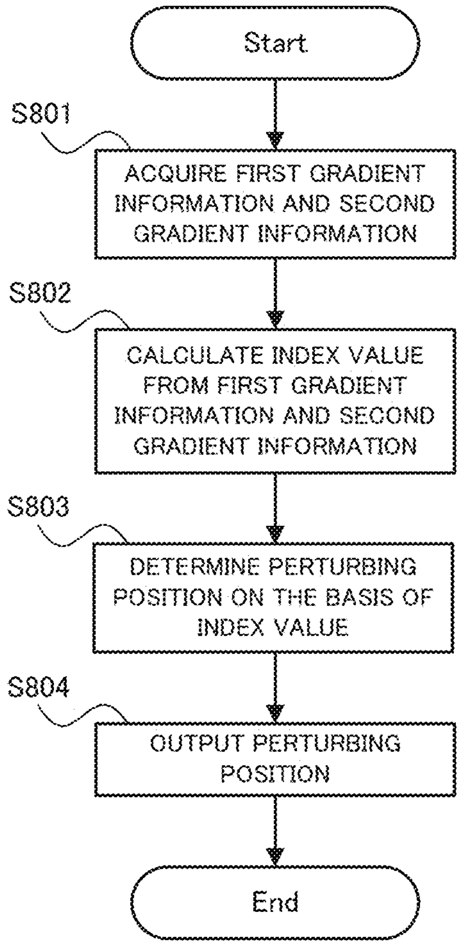
FIG. 13 is a flowchart illustrating a flow of a perturbing position determination operation by an information processing apparatus according to an eighth example embodiment.

As illustrated in FIG. 13, in the perturbing position determination operation by the information processing apparatus 10 according to the eighth example embodiment, first, the perturbing position determination unit 130 acquires the first gradient information (i.e., the gradient information about the gradient of the degree of similarity between the first information feature quantity and the second information feature quantity) and the second gradient information (i.e., the gradient information about the gradient of the degree of similarity between the first information feature quantity and the third information feature quantity) calculated by the gradient information calculation unit 120 (step S801).

Subsequently, the perturbing position determination unit 130 calculates an index value from the first gradient information and the second gradient information calculated by the gradient information calculating unit 120 (step S802). The "index value" here is a value that is used as an index to determine the perturbing position. The index value may be, for example, a value calculated as a product of the first gradient information and the second gradient information. Alternatively, the index value may be a weighted sum of the first gradient information and the second gradient information. Alternatively, the index value may be a sum of an absolute value of the first gradient information and an absolute value of the second gradient information.

Subsequently, the perturbing position determination unit 130 determines the perturbing position in the first information, on the basis of the calculated index value (step S803). For example, the perturbing position determination unit 130 may determine one element with the highest index value, to be the perturbing position (see the third example embodiment). Alternatively, the perturbing position determination unit 130 may determine a predetermined number of elements in descending order of the index value, to be the perturbing position (see the fourth example embodiment). Alternatively, the perturbing position determination unit 130 may determine an element in which the index value is greater than a predetermined threshold, to be the perturbing position (see the fifth example embodiment). Thereafter, the perturbing position determination unit 130 outputs the information about the element to perturbed to the perturbing unit 140 (S804).

Technical Effect

Next, a technical effect obtained by the information processing apparatus 10 according to the eighth example embodiment will be described.

As described in FIG. 13, in the information processing apparatus 10 according to the eighth example embodiment, the element to perturbed is determined on the basis of the index value calculated from the first gradient information and the second gradient information. In this way, it is possible to determine to determine the perturbing position in view of the degree of similarity between the first information and the second information, and the degree of similarity between the first information and the third information. Therefore, it is possible to properly generate the adversarial sample and to assess the risk of the authentication processing.

A processing method that is executed on a computer by recording, on a recording medium, a program for allowing the configuration in each of the example embodiments to be operated so as to realize the functions in each example embodiment, and by reading, as a code, the program recorded on the recording medium, is also included in the scope of each of the example embodiments. That is, a computer-readable recording medium is also included in the range of each of the example embodiments. Not only the recording medium on which the above-described program is recorded, but also the program itself is also included in each example embodiment.

The recording medium to use may be, for example, a floppy disk (registered trademark), a hard disk, an optical disk, a magneto-optical disk, a CD-ROM, a magnetic tape, a nonvolatile memory card, or a ROM. Furthermore, not only the program that is recorded on the recording medium and that executes processing alone, but also the program that operates on an OS and that executes processing in cooperation with the functions of expansion boards and another software, is also included in the scope of each of the example embodiments. In addition, the program itself may be stored in a server, and a part or all of the program may be downloaded from the server to a user terminal.

SUPPLEMENTARY NOTES

The example embodiments described above may be further described as, but not limited to, the following Supplementary Notes below.

Supplementary Note 1

An information processing apparatus according to Supplementary Note 1 is an information processing apparatus including: a similarity degree calculation unit that calculates a degree of similarity between a feature quantity of first information and a feature quantity of second information; a gradient information calculation unit that calculates gradient information indicating a gradient of the degree of similarity; a perturbing position determination unit that determines an element serving as a perturbing target in the first information, on the basis of the gradient information; a perturbing unit that applies a perturbation to the element serving as the perturbing target in the first information; and a risk assessment unit that assesses a risk in authentication processing on the basis of a result of the authentication processing of collating/verifying the first information to which the perturbation is applied, and the second information.

Supplementary Note 2

An information processing apparatus according to Supplementary Note 2 is the information processing apparatus according to Supplementary Note 1, wherein the first information is a first image including a first living body, the second information is a second image including a second living body, and the similarity degree calculation unit calculates a degree of similarity between a feature quantity about the first living body extracted from the first image and a feature quantity about the second living body extracted from the second image.

Supplementary Note 3

An information processing apparatus according to Supplementary Note 3 is the information processing apparatus according to Supplementary Note 1 or 2, wherein the perturbing position determination unit determines one element with the highest gradient information, to be the element serving as the perturbing target.

Supplementary Note 4

An information processing apparatus according to Supplementary Note 4 is the information processing apparatus according to Supplementary Note 1 or 2, wherein the perturbing position determination unit determines a predetermined number of elements in descending order of the gradient information, to be the element serving as the perturbing target.

Supplementary Note 5

An information processing apparatus according to Supplementary Note 5 is the information processing apparatus according to Supplementary Note 1 or 2, wherein the perturbing position determination unit determines an element in which the gradient information is greater than a predetermined threshold, to be the element serving as the perturbing target.

Supplementary Note 6

An information processing apparatus according to Supplementary Note 6 is the information processing apparatus according to any one of Supplementary Notes 1 to 5, wherein the risk assessment unit calculates a false authentication probability in the authentication processing and assesses the risk in the authentication processing on the basis of the false authentication probability.

Supplementary Note 7

An information processing apparatus according to Supplementary Note 7 is the information processing apparatus according to any one of Supplementary Notes 1 to 6, wherein the similarity degree calculation unit calculates a degree of similarity between the feature quantity of the first information and a feature quantity of third information, in addition to the degree of similarity between the feature quantity of the first information and the feature quantity of the second information, the gradient information calculation unit calculates the gradient information about a gradient of the degree of similarity between the feature quantity of the first information and the feature quantity of the third information, in addition to the gradient information about the gradient of the degree of similarity between the feature quantity of the first information and the feature quantity of the second information, and the perturbing position determination unit determines the element serving as the perturbing target on the basis of the gradient information about the gradient of the degree of similarity between the feature quantity of the first information and the feature quantity of the third information and the gradient information about the gradient of the degree of similarity between the feature quantity of the first information and the feature quantity of the third information.

Supplementary Note 8

An information processing apparatus according to Supplementary Note 8 is The Information processing apparatus according to Supplementary Note 7, wherein the perturbing position determination unit determines the element serving as the perturbing target, by using at least one of a product, a weighted sum, and a sum of absolute values of the gradient information about the gradient of the degree of similarity between the feature quantity of the first information and the feature quantity of the third information and the gradient information about the gradient of the degree of similarity between the feature quantity of the first information and the feature quantity of the third information.

Supplementary Note 9

An information processing method according to Supplementary Note 9 is an information processing method that is executed by at least one computer, the information processing method including: calculating a degree of similarity between a feature quantity of first information and a feature quantity of second information; calculating gradient information indicating a gradient of the degree of similarity; determining an element serving as a perturbing target in the first information, on the basis of the gradient information; applying a perturbation to the element serving as the perturbing target in the first information; and assessing a risk in authentication processing on the basis of a result of the authentication processing of collating/verifying the first information to which the perturbation is applied, and the second information.

Supplementary Note 10

A recording medium according to Supplementary Note 10 is a recording medium on which a computer program that allows at least one computer to execute an information processing method is recorded, the information processing method including: calculating a degree of similarity between a feature quantity of first information and a feature quantity of second information; calculating gradient information indicating a gradient of the degree of similarity; determining an element serving as a perturbing target in the first information, on the basis of the gradient information; applying a perturbation to the element serving as the perturbing target in the first information; and assessing a risk in authentication processing on the basis of a result of the authentication processing of collating/verifying the first information to which the perturbation is applied, and the second information.

Supplementary Note 11

A computer program according to Supplementary Note 11 is a computer program that allows at least one computer to execute an information processing method, the information processing method including: calculating a degree of similarity between a feature quantity of first information and a feature quantity of second information; calculating gradient information indicating a gradient of the degree of similarity; determining an element serving as a perturbing target in the first information, on the basis of the gradient information; applying a perturbation to the element serving as the perturbing target in the first information; and assessing a risk in authentication processing on the basis of a result of the authentication processing of collating/verifying the first information to which the perturbation is applied, and the second information.

Supplementary Note 12

An information processing system according to Supplementary Note 12 is an information processing apparatus including: a similarity degree calculation unit that calculates a degree of similarity between a feature quantity of first information and a feature quantity of second information; a gradient information calculation unit that calculates gradient information indicating a gradient of the degree of similarity; a perturbing position determination unit that determines an element serving as a perturbing target in the first information, on the basis of the gradient information; a perturbing unit that applies a perturbation to the element serving as the perturbing target in the first information; and a risk assessment unit that assesses a risk in authentication processing on the basis of a result of the authentication processing of collating/verifying the first information to which the perturbation is applied, and the second information.

This disclosure is allowed to be changed, if desired, without departing from the essence or spirit of this disclosure which can be read from the claims and the entire specification. An information processing apparatus, an information processing method, and a recording medium with such changes are also intended to be within the technical scope of this disclosure.

DESCRIPTION OF REFERENCE CODES

10 Information processing apparatus
11 Processor
110 Similarity degree calculation unit
120 Gradient information calculation unit
130 Perturbing position determination unit
140 Perturbing unit
150 Risk assessment unit
160 Feature quantity extraction unit

What is claimed is:

1. An information processing apparatus comprising:
at least one memory configured to store instructions; and
at least one processor configured to execute the instructions to:
calculate a degree of similarity between a feature quantity of first information and a feature quantity of second information;
calculate gradient information indicating a gradient of the degree of similarity;
determine an element serving as a perturbing target in the first information, on the basis of the gradient information;
apply a perturbation to the element serving as the perturbing target in the first information;
assess a risk in authentication processing on the basis of the second information and a result of the authentication processing of collating or verifying the first information to which the perturbation is applied; and
calculate a false authentication probability in the authentication processing and assess the risk in the authentication processing on the basis of the false authentication probability.

2. The information processing apparatus according to claim 1, wherein
the first information is a first image comprising a first living body,
the second information is a second image comprising a second living body, and
the at least one processor is configured to execute the instructions to calculate a degree of similarity between a feature quantity associated with the first living body extracted from the first image and a feature quantity associated with the second living body extracted from the second image.

3. The information processing apparatus according to claim 1, wherein the at least one processor is configured to execute the instructions to determine one element with a highest gradient information to be the element serving as the perturbing target.

4. The information processing apparatus according to claim 1, wherein the at least one processor is configured to execute the instructions to determine a predetermined number of elements in descending order of the gradient information to be the element serving as the perturbing target.

5. The information processing apparatus according to claim 1, wherein the at least one processor is configured to execute the instructions to determine an element in which the gradient information is greater than a predetermined threshold to be the element serving as the perturbing target.

6. The information processing apparatus according to claim 1, wherein the at least one processor is configured to execute the instructions to:
calculate a degree of similarity between the feature quantity of the first information and a feature quantity of third information;
calculate second gradient information about a gradient of the degree of similarity between the feature quantity of the first information and the feature quantity of the third information; and
determine the element serving as the perturbing target on the basis of the gradient information and the second gradient information.

7. The Information processing apparatus according to claim 6, wherein the at least one processor is configured to execute the instructions to determine the element serving as the perturbing target, by using at least one of a product, a weighted sum, or a sum of absolute values of the gradient information and the second gradient information.

8. An information processing method that is executed by at least one computer, the information processing method comprising:
calculating a degree of similarity between a feature quantity of first information and a feature quantity of second information;
calculating gradient information indicating a gradient of the degree of similarity;
determining an element serving as a perturbing target in the first information, on the basis of the gradient information;
applying a perturbation to the element serving as the perturbing target in the first information;
assessing a risk in authentication processing on the basis of the second information and a result of the authentication processing of collating or verifying the first information to which the perturbation is applied; and
calculating a false authentication probability in the authentication processing and assess the risk in the authentication processing on the basis of the false authentication probability.

9. A non-transitory recording medium on which a computer program that allows at least one computer to execute an information processing method is recorded, the information processing method comprising:
calculating a degree of similarity between a feature quantity of first information and a feature quantity of second information;
calculating gradient information indicating a gradient of the degree of similarity;
determining an element serving as a perturbing target in the first information, on the basis of the gradient information;
applying a perturbation to the element serving as the perturbing target in the first information;
assessing a risk in authentication processing on the basis of the second information and a result of the authentication processing of collating or verifying the first information to which the perturbation is applied; and
calculating a false authentication probability in the authentication processing and assess the risk in the authentication processing on the basis of the false authentication probability.

* * * * *